(12) United States Patent
Redder

(10) Patent No.: US 11,333,220 B2
(45) Date of Patent: May 17, 2022

(54) RATCHETING CHAIN/CABLE TIGHTENER

(71) Applicant: WESTDEUTSCHER DRAHTSEIL-VERKAUF DOLEZYCH GMBH & CO. KG, Dortmund (DE)

(72) Inventor: Manfred Redder, Selm (DE)

(73) Assignee: WESTDEUTSCHER DRAHTSEIL-VERKAUF DOLEZYCH GMBH & CO. KG, Dortmund (DE)

( * ) Notice: Subject to any disclaimer, the term of this patent is extended or adjusted under 35 U.S.C. 154(b) by 615 days.

(21) Appl. No.: 16/334,426

(22) PCT Filed: Oct. 12, 2017

(86) PCT No.: PCT/EP2017/076100
§ 371 (c)(1),
(2) Date: Mar. 19, 2019

(87) PCT Pub. No.: WO2018/073098
PCT Pub. Date: Apr. 26, 2018

(65) Prior Publication Data
US 2021/0301902 A1    Sep. 30, 2021

(30) Foreign Application Priority Data

Oct. 20, 2016 (DE) .............................. 202016006553

(51) Int. Cl.
| F16G 11/12 | (2006.01) |
| B60P 7/08 | (2006.01) |
| F16B 7/06 | (2006.01) |
| F16G 3/00 | (2006.01) |

(52) U.S. Cl.
CPC .............. F16G 11/12 (2013.01); B60P 7/083 (2013.01); F16B 7/06 (2013.01); F16G 3/006 (2013.01)

(58) Field of Classification Search
CPC .............. F16G 11/12; B60P 7/083; F16B 7/06
See application file for complete search history.

(56) References Cited

U.S. PATENT DOCUMENTS

| 1,037,615 | A | * | 9/1912 | Grenier .................... F16G 3/006 254/232 |
| 1,971,472 | A | * | 8/1934 | Wolf ....................... F16G 15/00 403/202 |
| 2,128,030 | A | * | 8/1938 | Koleno .................... E04H 17/04 267/72 |
| 2,420,364 | A |   | 5/1947 | Espenas |
| 2,822,199 | A | * | 2/1958 | Johnson .................. F16G 11/12 403/45 |

(Continued)

FOREIGN PATENT DOCUMENTS

| DE | 2310152 A | 9/1974 |
| EP | 1460306 A | 9/2004 |
| GB | 1475254 B | 6/1977 |

*Primary Examiner* — Michael E Gallion
(74) *Attorney, Agent, or Firm* — Andrew Wilford

(57) ABSTRACT

The invention relates to a ratchet tightener for tensioning chains, belts and similar, comprising two end pieces 3 and 4 between which a lead screw 2 is arranged and screwed to same, wherein the axial distance between said end pieces 3 and 4 can be altered by rotating the lead screw 2 by means of a ratchet, characterised in that the threaded rod 8 is in the form of a tube into which the threaded rod 7 can descend.

8 Claims, 2 Drawing Sheets

(56) References Cited

U.S. PATENT DOCUMENTS

| | | | | |
|---|---|---|---|---|
| 3,402,518 | A * | 9/1968 | Lettunich | E04H 12/20 |
| | | | | 52/149 |
| 4,130,269 | A * | 12/1978 | Schreyer | F16G 11/12 |
| | | | | 24/19 |
| 7,552,913 | B1 * | 6/2009 | Amoss | F16G 11/12 |
| | | | | 254/233 |
| 8,506,199 | B2 * | 8/2013 | Rump | B25B 13/50 |
| | | | | 403/43 |
| 10,464,467 | B2 * | 11/2019 | Robins | B63B 25/24 |
| 11,110,849 | B1 * | 9/2021 | Alterie | B60P 7/083 |
| 2019/0351809 | A1 * | 11/2019 | Liu | B60P 7/083 |
| 2020/0362942 | A1 * | 11/2020 | Martens | F16G 11/12 |

* cited by examiner

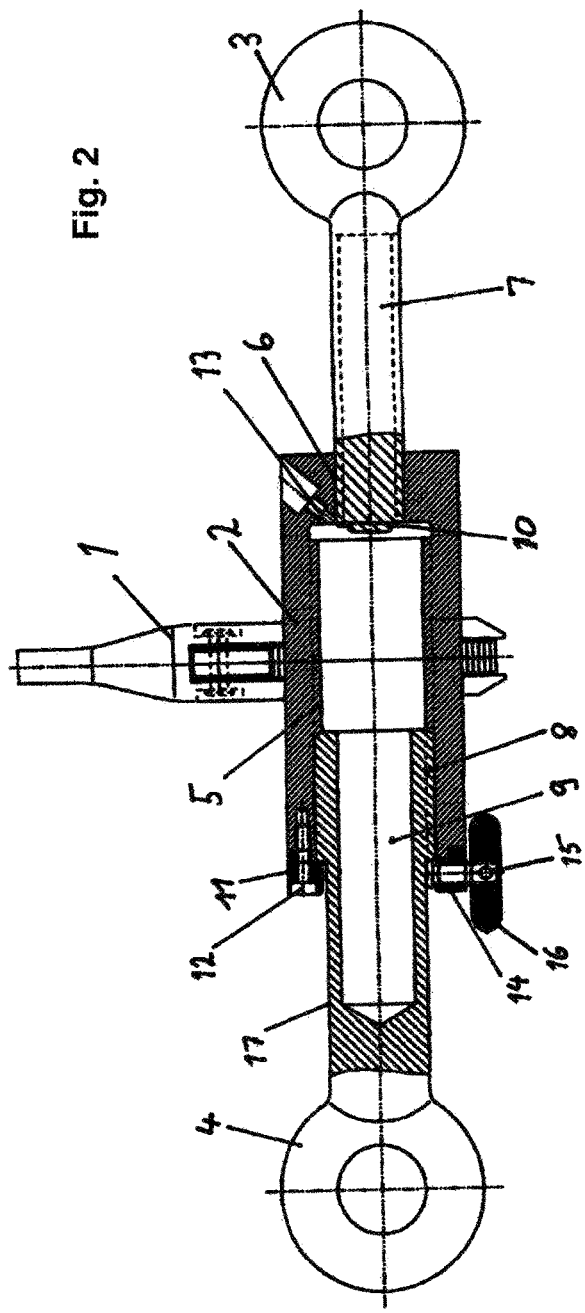

RATCHETING CHAIN/CABLE TIGHTENER

CROSS REFERENCE TO RELATED APPLICATIONS

This application is the US-national stage of PCT application PCT/EP2017/076100 filed 12 Oct. 2017 and claiming the priority of German patent application 202016006553 itself filed 20 Oct. 2016.

The invention relates to a tightener for ropes or chains that has a double-threaded tube on whose two internally threaded ends anchor formations are carried, it being possible for the axial spacing between the two anchor formations to be altered by rotating the threaded tube by a ratchet mechanism.

Ratcheting tighteners are widely used in the field of lifting and transport technology, particularly in combination with chains, ropes, or belts. To secure a load on a truck, for example, lashing chains or belts are used to secure the cargo on the transport against slipping or loosening. Fastening anchors are usually attached to the ends of the lashing chains or belts that are connected to the transport means on the one hand and to the payload on the other hand. The lashing chains or belts are then tensioned with the aid of a ratcheting tightener.

Such a ratcheting tightener is known, for example, from EP 1 460 306. It comprises a double-threaded tube that can be rotated by a ratchet mechanism relative to two end pieces that are connected to it. The rotationally symmetrical threaded tube has an internal thread at its two ends, the two end pieces having an external thread on their ends engaged in the threaded tube. On its side facing away from the threaded rod, each of the end pieces can be a ring in which a connecting member with a hook or shortening hook can be suspended, or as a hook or shortening hook.

In order to alter the spacing between the hooks or shortening hooks that are suspended in the end pieces by rotating the threaded rod, the threads at the ends of the threaded rod usually have opposite hands. The end pieces can be screwed into the threaded rod only until the threaded ends of the end pieces come into contact in the threaded rod. This has the consequence that the ratcheting tightener either has a relatively long overall length if there is a desire to ensure sufficient clamp travel in order to achieve the required clamping force, or the usable clamp travel is very low if the overall length must be short for reasons relating to application engineering.

Taking this discussed prior art as a point of departure, it is therefore the object of the invention to further develop a ratcheting tightener of the type described above such that sufficient clamp travel is ensured with an overall length that is as short as possible. This object is achieved according to the invention for a ratcheting tightener of the type described above in that the threaded rod of one of the two end pieces is a tube into which the threaded rod of the other end piece can engage. The internal threads of the threaded rod have different diameters. According to another embodiment of the ratcheting tightener, the threaded rod has at least one locking screw that prevents rotation between the end piece and threaded rod.

The invention will be explained below on the basis of an embodiment with reference to the enclosed figures. In the drawing:

FIG. 2 is a schematic and partially sectional view of the ratcheting tightener in the extended state;

FIG. 3 is a schematic and partially sectional view of the pipe section 17.

Figure 1:
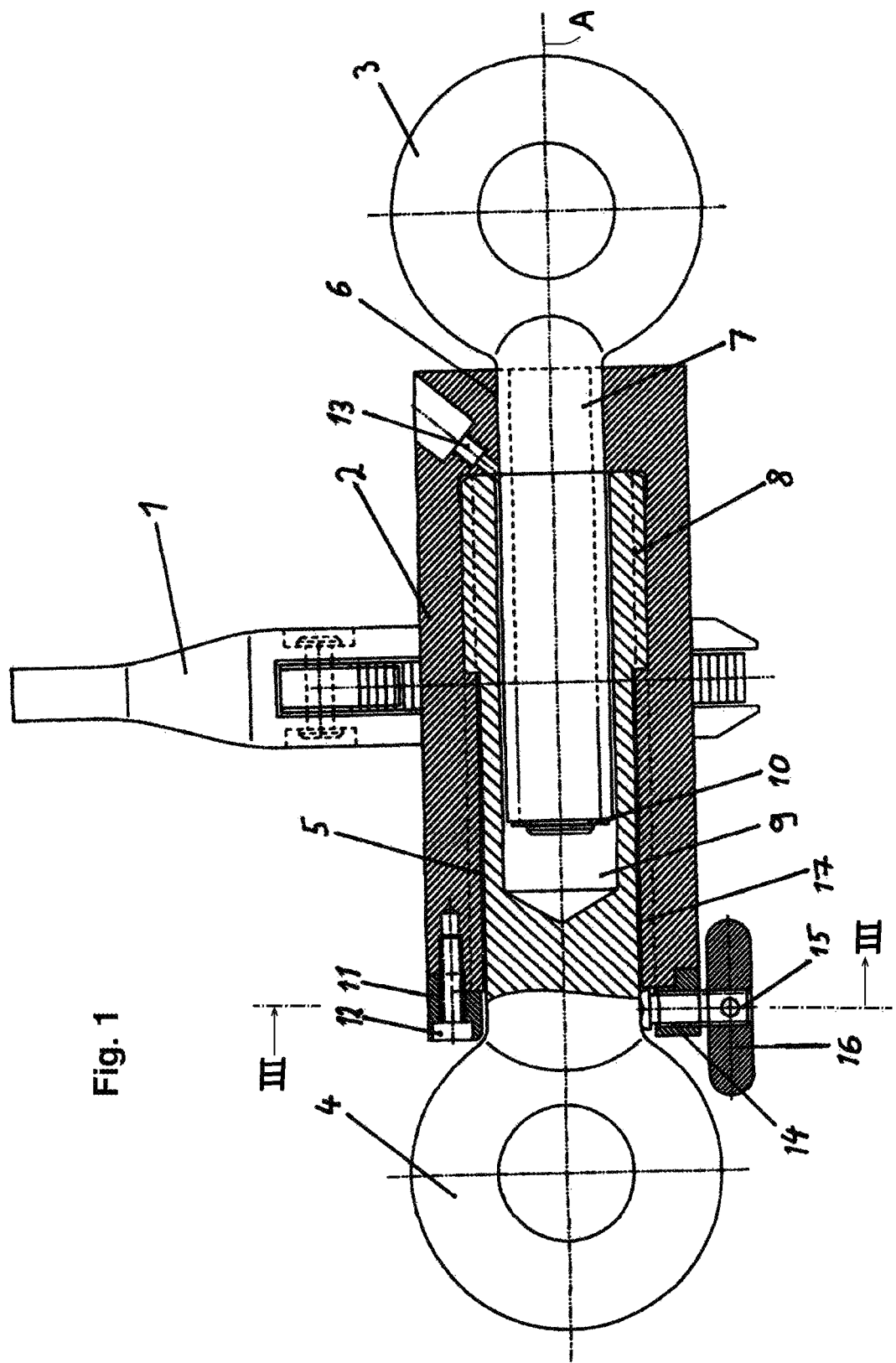
FIG. 1 is a schematic and partially sectional view of the ratcheting tightener in the retracted state.

FIG. 1 shows a ratcheting tightener in the retracted state with a ratchet mechanism 1 that is known from the prior art and with which an internally threaded tube 2 can be rotated relative to two threaded end pieces 3 and 4 that are connected to it. Screwthreads 5 and 6 of opposite hand are provided at the ends of the internally threaded tube 2 and that have a right-hand thread on the one hand and as a left-hand thread on the other hand. Threaded rods 7 and 8 of the end pieces 3 and 4 are screwed into the screwthreads 5 and 6. The end pieces 3 and 4 have anchor formations at their outer ends situated opposite the screwthread that can be a stop eye or a fork (not shown here) to which the lashing chains or belts are secured.

By rotating the internally threaded tube 2, the end pieces 3 and 4 are simultaneously screwed into or out of the internally threaded tube 2 depending on the direction of rotation of the internally threaded tube 2, and the axial spacing between the anchor formations is altered and the lashing chains or belts are loosened or tightened. In order for the end pieces 3 and 4 to make the same axial change in length with each revolution of the internally threaded tube 2, the screwthreads 5 and 6 are of the same pitch.

The threaded rod 8 of the end piece 4 is formed with a bore 9. The bore 9 is dimensioned such that the threaded rod 7 of the end piece 3 can engage axially into the bore 9. The internally threaded tube 2 can thus have a very short length.

FIG. 2 shows a ratcheting tightener with maximally extended end pieces 3 and 4. In order to prevent the accidental complete unscrewing of the threaded rods 7 and 8 from the internally threaded tube 2, end stops 10 and 11 are provided at the inner ends of the threaded rod 7 and on the internally threaded tube 2. The end stop on the threaded rod 7 is a snap ring 10 attached to the end of the threaded rod and of a diameter greater than the inner diameter of the thread of the screwthread 6. An end cap 11 fastened to the internally threaded tube 2 with at least two screws 12 serves as an end stop for the threaded rod 8. An inner diameter of the end cap 11 is smaller than an outer diameter of the thread of the threaded rod 8.

Since ratcheting tighteners are often exposed to the effects of the weather, relubrication is required. A lubrication hole 13 is provided in the internally threaded tube 2 for this purpose. The lubrication hole 13 can be sealed with a screw plug or a grease nipple (not shown here).

In order to prevent the ratcheting tightener from loosening as a result of automatic unscrewing of the end pieces 3 and 4 from the internally threaded tube 2 caused by to shocks, for example, an anti-unscrewing means is required. To this end, a threaded hole 14 is provided in the end cap 11 into and out of which a threaded bolt 15 can be screwed by handwheel 16.

The arrangement is shown in an enlarged section in FIG. 3. If the threaded bolt 15 screwed in by the handwheel 16 so far that it bears radially inwardly on an unthreaded region 17 of the end piece 4 so that the end piece 4 and end cap 11 are positively interconnected, thereby preventing rotation of the threaded rod and thus the releasing of the ratcheting tightener as a result of automatic rotation. In order to ensure a positive connection, the unthreaded pipe section 17 is of polygonal section.

| List of reference symbols |
| --- |
| 1 ratchet |
| 2 threaded rod |
| 3 end piece |
| 4 end piece |
| 5 threaded end of the tube 2 |
| 6 threaded end of the tube 2 |
| 7 threaded rod |
| 8 threaded rod |
| 9 bore in the rod 8 |
| 10 snap ring |
| 11 end cap |
| 12 fixing screw |
| 13 threaded hole |
| 14 threaded hole |
| 15 threaded bolt |
| 16 handwheel |
| 17 unthreaded region of end piece 4 |

The invention claimed is:

1. A ratcheting tightener for tensioning a chain or a belt, the tightener comprising:
two end pieces each having an externally threaded rod, one of the rods being left-hand threaded and the other of the rods being right-hand threaded;
a tube having two coaxial and oppositely open bores formed with internal opposite screwthreads into which the rods of the end pieces are screwed axially, whereby rotation of the tube in one direction moves screws in both of the rods and opposite rotation screws them both out;
a ratchet mechanism by which an axial spacing between the end pieces can be altered by rotating the internally threaded tube one of the threaded rods being tubular such that the other threaded rod can engage axially into the one threaded rod;
a snap ring mounted on an inner end of the one threaded rod and of an outer diameter greater than that of the respective bore such that the one rod cannot be screwed out of the tube; and
an end cap attached as an end stop by at least two screws to the internally threaded tube whose inner diameter is less than an outer diameter of the thread of the other threaded rod.

2. The ratcheting tightener according to claim 1, wherein the threads of the bores of the tube have the same pitch.

3. The ratcheting tightener according to claim 1, wherein a threaded hole is provided in the internally threaded tube through which lubricant can be added as needed by the screwthreads.

4. The ratcheting tightener according to claim 3, wherein the threaded hole is closed by a screw plug or grease nipple.

5. The ratcheting tightener according to claim 1, wherein a threaded hole is provided in the end cap.

6. The ratcheting tightener according to claim 5, further comprising:
a bolt screwed into the threaded hole.

7. The ratcheting tightener according to claim 6, wherein the threaded bolt carries and is rotatable by a handwheel.

8. The ratcheting tightener according to claim 6, wherein an outer surface of a one of the rods is of polygonal section and is engageable by the bolt.

\* \* \* \* \*